Feb. 16, 1954  R. H. GRIFFIN  2,669,111
FLUID PRESSURE TREATMENT OF SKINS
Filed July 28, 1950  10 Sheets-Sheet 1

Inventor:
Robert H. Griffin
By Wilmer Mechlin
his Attorney

Inventor:
Robert H. Griffin
By Wilmer Mechlin
his Attorney

Feb. 16, 1954 R. H. GRIFFIN 2,669,111
FLUID PRESSURE TREATMENT OF SKINS
Filed July 28, 1950 10 Sheets-Sheet 7

Inventor:
Robert H. Griffin
By Wilmer Mechlin
his Attorney

Feb. 16, 1954     R. H. GRIFFIN     2,669,111
FLUID PRESSURE TREATMENT OF SKINS

Filed July 28, 1950     10 Sheets-Sheet 8

Inventor:
Robert H. Griffin
By Wilmer Mechlin
his Attorney

Feb. 16, 1954 R. H. GRIFFIN 2,669,111
FLUID PRESSURE TREATMENT OF SKINS
Filed July 28, 1950 10 Sheets-Sheet 9

Inventor:
Robert H. Griffin
By Wilmer Mechlin
his Attorney

Feb. 16, 1954 R. H. GRIFFIN 2,669,111
FLUID PRESSURE TREATMENT OF SKINS
Filed July 28, 1950 10 Sheets—Sheet 10

Inventor:
Robert H. Griffin
By Wilmer Mechlin
his Attorney

Patented Feb. 16, 1954

2,669,111

UNITED STATES PATENT OFFICE 2,669,111

FLUID PRESSURE TREATMENT OF SKINS

Robert Hamilton Griffin, Yonkers, N. Y.

Application July 28, 1950, Serial No. 176,445

16 Claims. (Cl. 69—41)

This invention relates to the treatment of skins, hides and the like and particularly to their treatment by fluid pressure.

In preparing leather from skins, hides and the like, hereinafter termed generally "skins," it is the general practice to "lime" the skins as they are delivered to the tannery. The limed skins are then subjected to the "beam-house" operations, mainly unhairing and fleshing, by which hair and flesh, as well as other excess tissue or natural matter, are detached, disconnected or severed and removed from the grain and flesh sides of the skins. The treating devices generally used for performing these beam-house operations are rotary cutters which differ somewhat in blade configuration depending upon the side of a skin on which they work, the blades of the unhairing cutters being round-nosed and those of the fleshing cutters sharp-edged. Although such cutters have proved effective in action, the problems presented by the variations found in the size and shape of different skins and the variations in the thickness of an individual skin, both in the skin proper or corium and in the flesh and epidermal layers, have rendered it extremely difficult to limit the action of the cutters to the excess matter. It was therefore proposed in my copending application Serial No. 703,571, filed October 16, 1946, to utilize high pressure fluid jets in place of mechanical cutters for both unhairing and fleshing, which by virtue of the inherent qualities of the fluid treating medium can compensate for any such irregularities in the skins. The present invention is an improvement in such fluid pressure treatment.

The primary object of the invention is to provide an improved apparatus and process for treating a skin by fluid pressure.

Another object of the invention is to provide fluid pressure apparatus for treating skins, by which excess natural matter can be severed and removed from either or both sides of a skin.

Another object of the invention is to provide a fluid pressure treatment for skins, by which all excess tissue can be removed without loss of any of the skin proper.

An additional object of the invention is to provide improved skin treating apparatus, by which all excess natural matter can be removed by fluid pressure from both sides of a skin in a single pass.

An additional object of the invention is to provide improved apparatus for treating skins by fluid pressure, whereby unhairing and fleshing can be performed through devices identical in structure.

A further object of the invention is to provide apparatus for treating skins by fluid pressure, whereby a succession of skins can be treated as a continuous process and in an operative cycle controlled by the particular skin undergoing treatment.

A further object of the invention is to provide apparatus for treating skins by fluid pressure, the action of which is readily variable to suit different types of skins and, once set, will treat skins uniformly with considerable latitude in variations of individual skins.

Other objects and advantages of the invention will appear hereinafter in the detailed description, be particularly pointed out in the appended claims and illustrated in the accompanying drawings, in which:

Figure 10 is a fragmentary view showing in enlarged scale the fluid pressure spray and related structure of Figure 4;

Figure 11 is a fragmentary view on an enlarged scale showing the foraminous construction of the feed conveyor;

Figure 9:
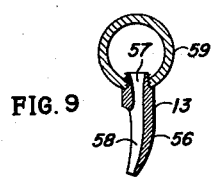
Figure 9 is an enlarged sectional view longitudinally of a nozzle, taken along the lines 9—9 of Figure 6.
Figure 8:
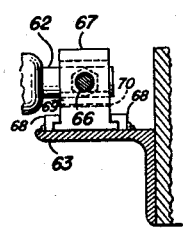
Figure 8 is a vertical sectional view, taken along the lines 8—8 of Figure 7.
Figure 7:
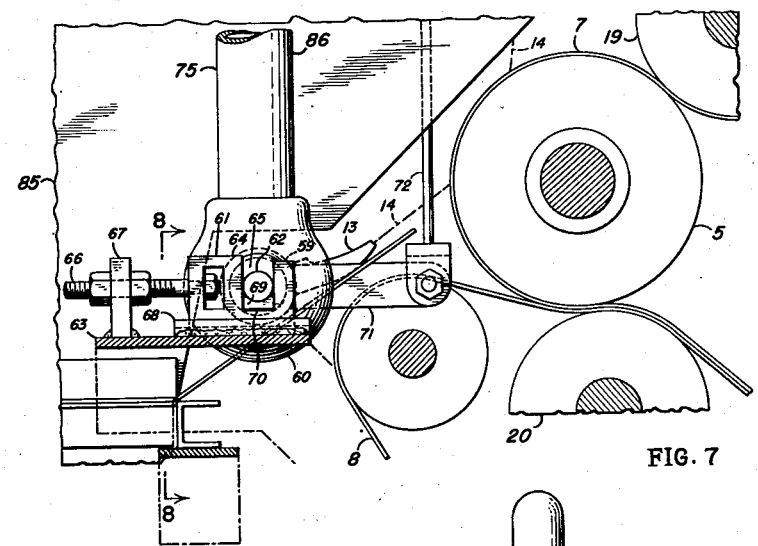
Figure 7 is a fragmentary vertical sectional view on an enlarged scale, taken along the lines 7—7 of Figure 6.
Figure 1:
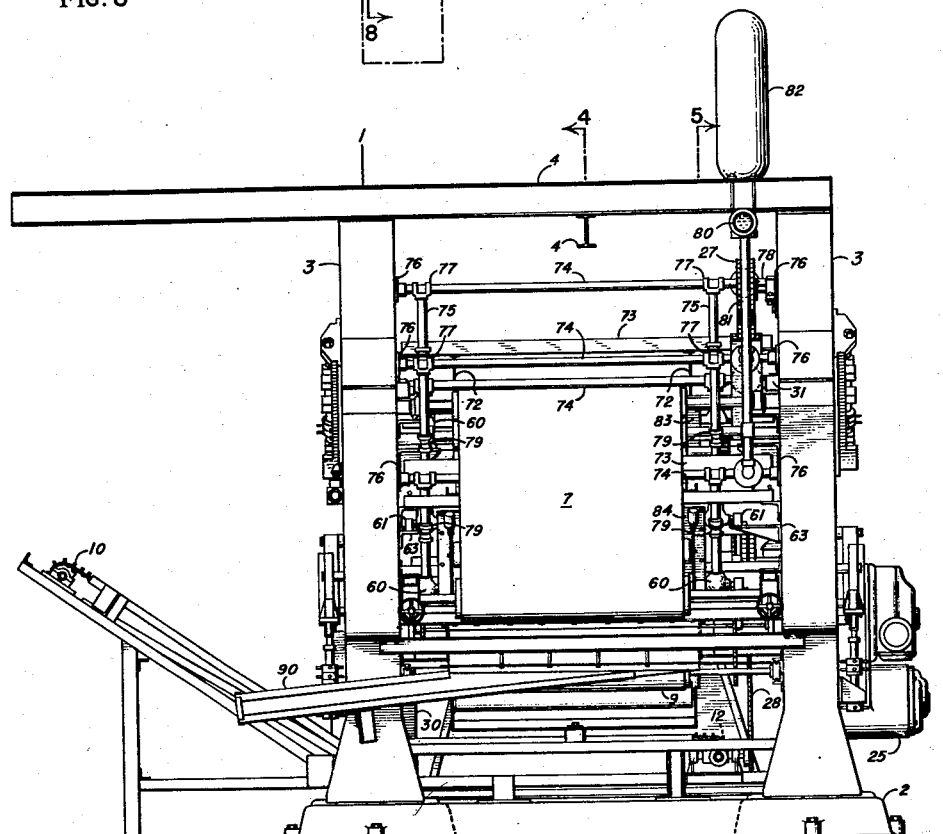
Figure 1 is a front elevational view of a preferred embodiment of the skin treating apparatus of the present invention.
Figure 2:
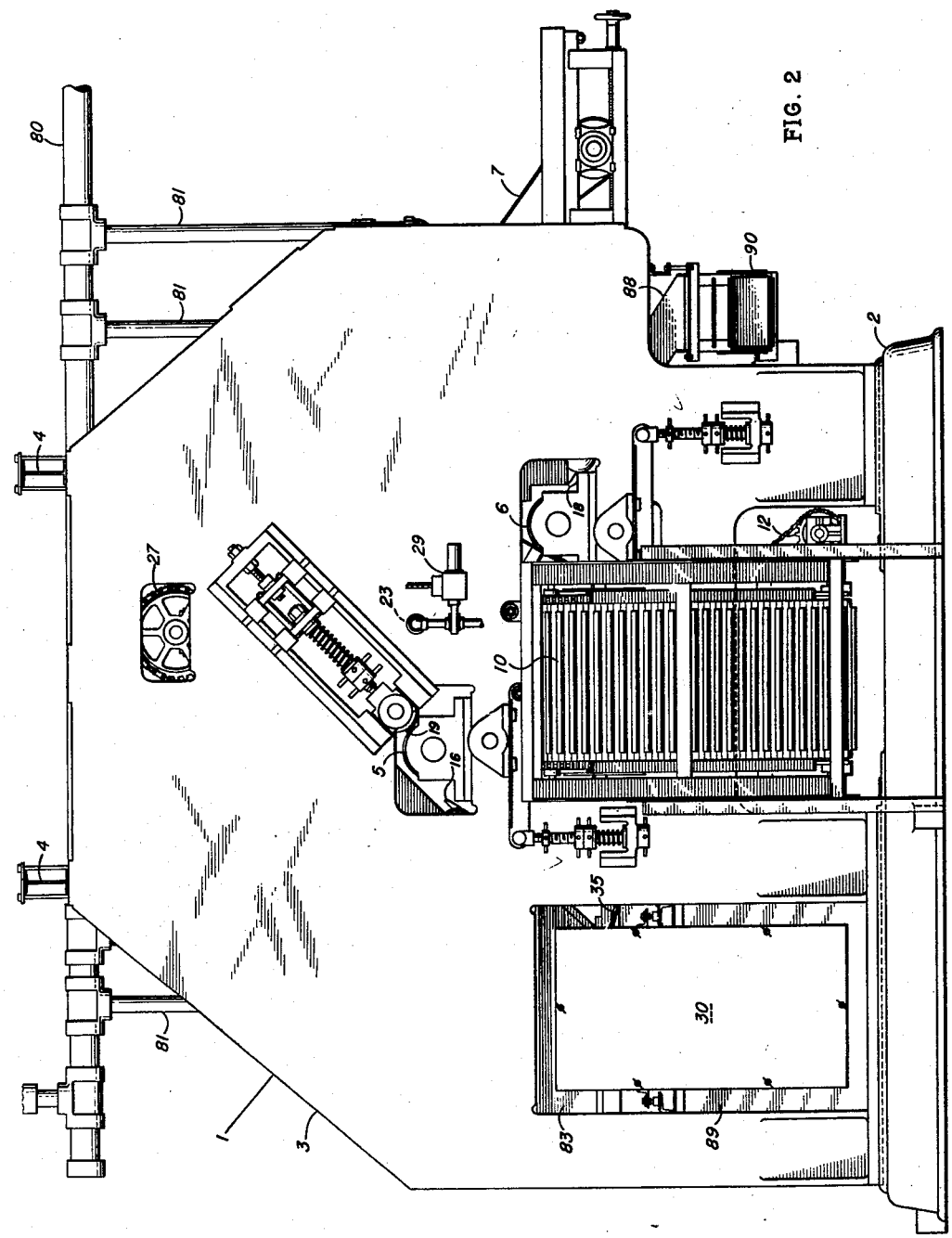
Figure 2 is a side elevational view of the apparatus on an enlarged scale, taken from the left side of Figure 1.
Figure 3:
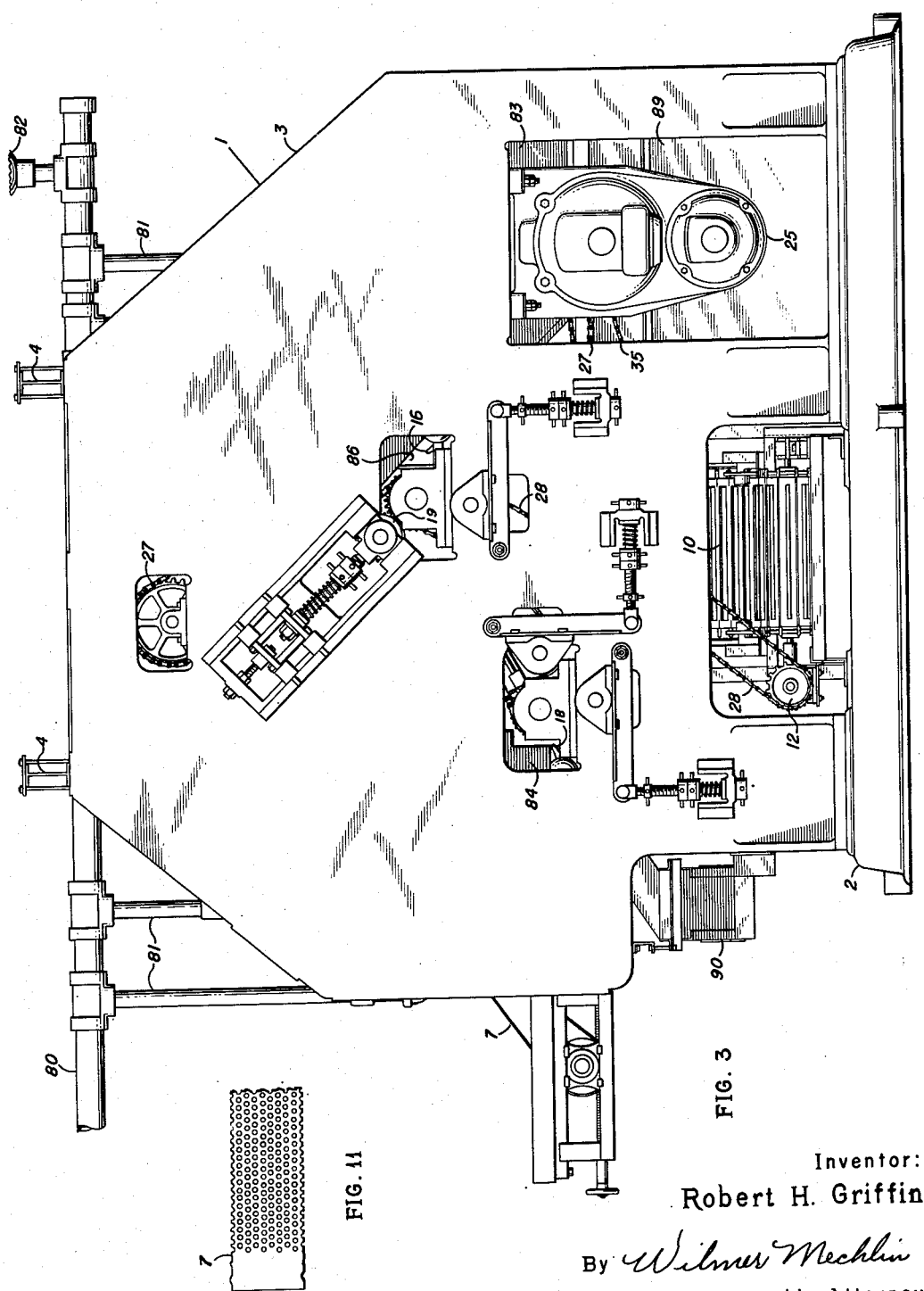
Figure 3 is a side elevational view of the apparatus on an enlarged scale, taken from the right side of Figure 1.
Figure 4:
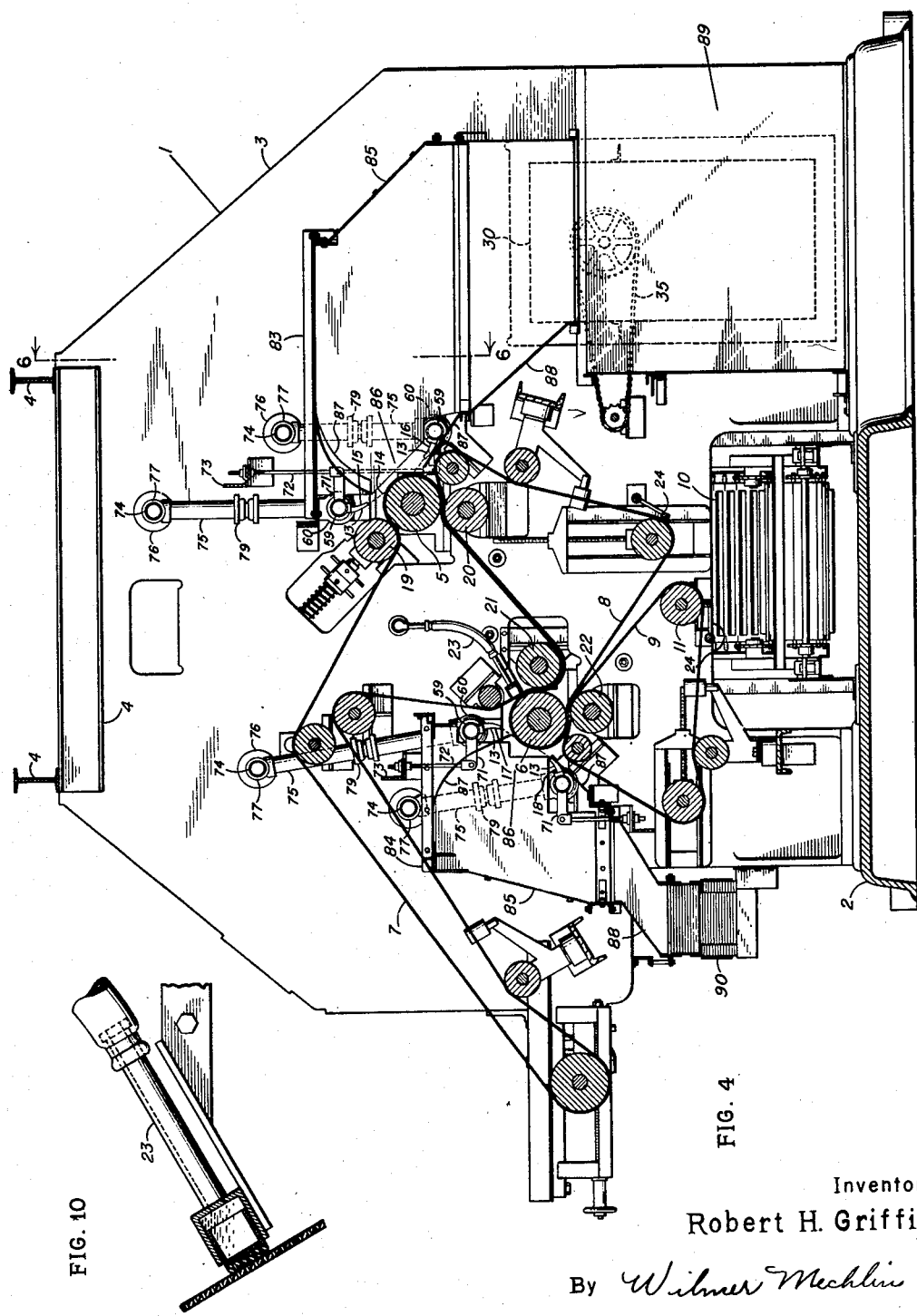
Figure 4 is a vertical sectional view on an enlarged scale, taken along the lines 4—4 of Figure 1.

Referring now in detail to the drawings in which like reference characters designate like parts, the improved fluid treating apparatus of the present invention embodies, for illustrative purposes, the apparatus of my co-pending application Serial No. 159,436, filed May 2, 1950, modified to adapt it to the treating of skins by fluid pressure. So modified, the apparatus is comprised of a frame 1 having a base 2 and laterally or transversely spaced sides or uprights 3. The frame may either be cast, as illustrated, or formed of weldments or of other suitable construction. For stiffening the upper end of the frame, I-beams 4, disposed both longitudinally and transversely of the frame, may be employed.

The apparatus is designed to treat the opposite sides, faces or surfaces of a skin at separate zones or positions spaced along its path of travel through the apparatus. To this end, there is provided a movable work support at each zone in the form of a rotary supporting or back-up drum or cylinder, that presenting the hair side of a skin numbered 5 and the other for the flesh side numbered 6, each of which is suitably journaled in the uprights 3. The skins are fed through the apparatus, past the treating zones, by a series of endless belt or like conveyors, arranged in sequence. Since a skin normally will be wet from liming when introduced into the apparatus and in that condition its flesh side has the better adherence to a belt, it is preferred first to treat the hair side so exposed. Accordingly, the first or leading zone is occupied by the first, upper or unhairing drum 5 to which a skin is fed by a feed or infeed conveyor 7 encircling the drum. As it leaves the first zone, the skin, still in contact with the feed conveyor, is supported on an intermediate conveyor 8, encircling the second, lower or fleshing drum 6, by which it is carried to and around the latter drum. The skin is then transferred to a third or end conveyor 9 from which it is deposited on a fourth or discharge conveyor 10, by which the skin is discharged from the apparatus. Of the several conveyors, the feed and intermediate conveyors are driven by the supporting drums which they encircle, the end conveyor by a drive pulley or roller 11 and the discharge conveyor, which is preferably of slatted construction, by a drive sprocket 12, the conveyors riding and being directed in their travel beyond these drive members by idler pulleys or rollers. While a skin, by the illustrated arrangement of the conveyors and supporting drums, is displaced both vertically and horizontally in its travel through the apparatus, the normal adherence between skin and belt has been found adequate to prevent relative slippage beyond the treating zones at the indicated inclines.

At each of the treating zones, the exposed side of a skin is treated by fluid pressure applied by a plurality of nozzles 13 arranged in a pair of banks, groups or sets, which are positioned in spaced stations circumferentially of the associated drum. As shown, the nozzles of the banks of each pair are preferably inclined inwardly relative to each other so as to direct convergent jet 14 of water or other suitable fluid against the skin. For differentiation, the leading or first and trailing or second banks of nozzles of the unhairing drum 5 are designated as 15 and 16, respectively, and the corresponding or third and fourth banks of the fleshing drum 6 as 17 and 18, respectively.

Since acting in convergent directions, the jets of each pair of banks of nozzles, alone, are incapable of spreading or stretching a skin taut during treatment, as is essential if the treatment is to be uniform. Accordingly, there is provided for each drum a pair of grip rolls, between which, circumferentially of the drum, are included the associated pair of banks of nozzles, the leading or first and trailing or second grip rolls of the unhairing drum being numbered 19 and 20, respectively, and the third and fourth or corresponding grip rolls of the fleshing drum 21 and 22, respectively. Each grip roll is yieldably urged by adjustable pressure against the associated drum through the confronting belt or belts and, by virtue of its partial wrap by the confronting conveyor and its spacing at substantially 100° circumferentially of the drum from the line of contact of the jets 14 of the companion bank of nozzles, is effective with these jets to provide, in the exposed side of the skin, the required smoothness and tautness.

It has been mentioned that a skin, as it leaves the unhairing drum 5, is carried between the feed and intermediate conveyors, 7 and 8, in its travel to the fleshing drum 6, this continuing until the two conveyors diverge beyond the third grip roll 21. To ensure that the leading edge of a skin will be detached from the feed conveyor at this point, and be carried around the fleshing drum, the feed conveyor is perforate or foraminous and backed, along its width at the point of divergence, by a fluid pressure spray or device 23 by which water or other fluid can be applied through the conveyor against the confronting side of a skin under sufficient pressure to detach or disconnect the skin from the conveyor. This spray need operate only until the leading edge of the skin has been gripped by the fourth grip roll 22 for the latter to detach the remainder of the skin and provision is made for such operation, in the manner hereinafter to be pointed out. Some difficulty also may be experienced due to adherence of the skin to the intermediate and discharge conveyors beyond the points of transfer to the succeeding conveyors. This may be avoided by use of mechanical scrapers 24 or sprays, such as the water spray 23, or both.

Figure 5:
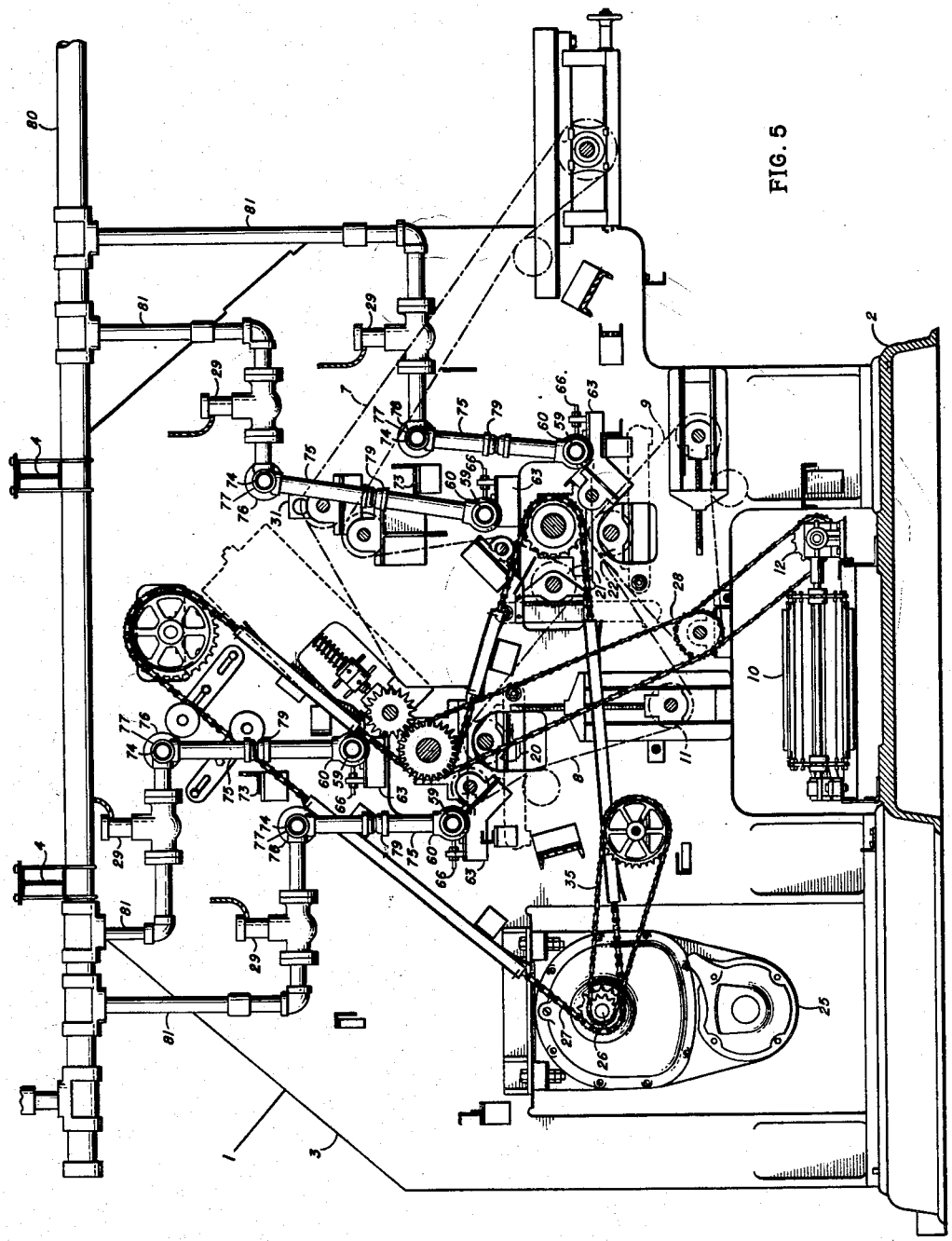
Figure 5 is a vertical sectional view on an enlarged scale, taken along the lines 5—5 of Figure 1.
Figure 6:
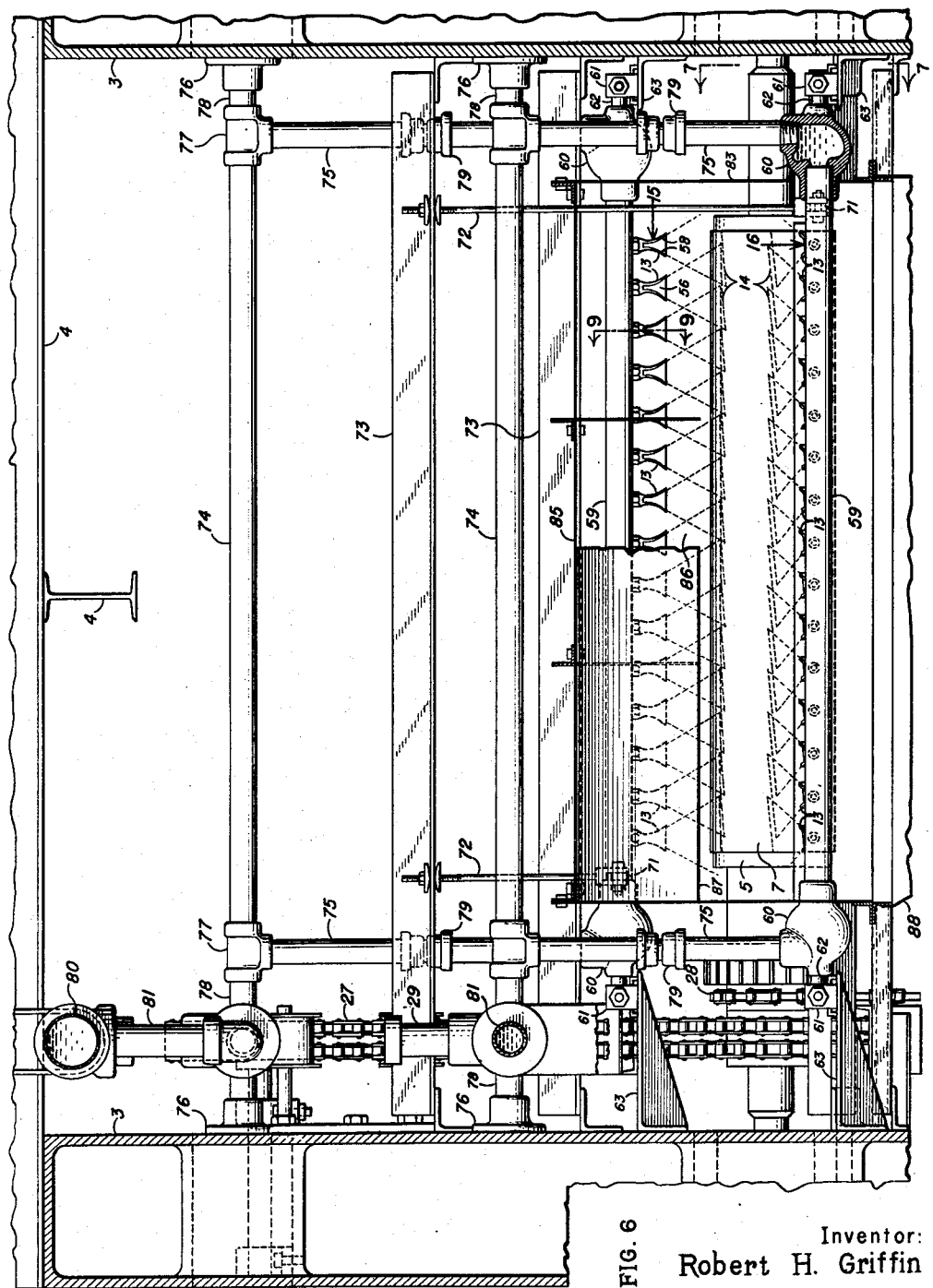
Figure 6 is a fragmentary vertical sectional view on an enlarged scale, taken along the lines 6—6 of Figure 4.

The several rotary elements of the apparatus are adapted to be driven by a single motor unit 25 mounted on one of the sides 3 of the frame, the unit preferably including an A. C. electric motor and a vari-pulley (not shown) by which the speed of its drive or drive member 26 can be varied over a wide range. The drivable connection between the drive unit and the several members is preferably obtained by a chain drive 27 connecting the drive member 26 directly to the unhairing and fleshing drums 5 and 6, and a second chain drive 28 driving the drive pulley and sprocket, 11 and 12, of the end and discharge conveyors, 9 and 10, off the unhairing drum. Of the several grip rolls, all but the first grip roll 19 are always separated from a skin by an intervening belt and therefore can effectively be driven off the associated drums by the engaging of the belts. However, the first grip roll bears directly against the skin and, to maintain the speed of the skin, as well as to prevent the skin from sticking to the grip roll, this roll is preferably driven off the unhairing drum by the intergearing connection shown in Figure 5, at a slightly higher peripheral speed than the drum.

In treating skins, the jets 14 of each bank are designed to operate intermittently and to act only upon a portion of the exposed side of a skin, with the remainder of that side treated by the companion or associated bank. With their nozzles inwardly directed in the manner illustrated, the first and second banks, 15 and 16, of the unhairing drum are designed to treat or act upon the leading and trailing portions, respectively, of the hair side of a skin and the third and fourth banks, 17 and 18, of the fleshing drum upon the corresponding portions of the flesh side of the skin, the first and third banks thus acting in or with and the second and fourth banks against or opposite the direction of travel of the skin. Not only does each bank of nozzles treat only a part of the presented side of a skin, but the duration of this treatment is automatically varied in accordance with variations in the lengths of the skins in the batch undergoing treatment. This is accomplished by the use of an electronic control acting through a solenoid actuated cut-or shut-off valve 29 for each bank of nozzles, for cutting on and off the flow of fluid to that bank, and by controlling the actuation of these valves by an electronic control 30 of the type illustrated in my application Serial No. 159,436. As in that application, the control is actuated or energized on the tripping of a photoelectric cell or like sensitive triggering device 31, positioned in advance of the unhairing drum 5 and having its beam so placed relative to the feed conveyor as to be interrupted by the leading edge of the skin and restored only after the trailing edge of the skin has passed its station. On interruption of the beam, a magnetic signal is initiated on a magnetizable member 32 of magnetic material through a magnetic inducing or recording head 33. To facilitate positioning of the several magnetic heads, the magnetizable member is preferably circular and may be a magnetic disk or, as illustrated, a magnetic tape, strip or band forming the peripheral layer of a non-magnetic disk 34. This disk is driven through a drive 35 by the motor unit 25 at a peripheral speed having a given ratio to the linear speed of the several conveyors, such that a single revolution of the disk covers an entire pass of a skin from the photoelectric cell 31 through the treating zones.

Figure 12:
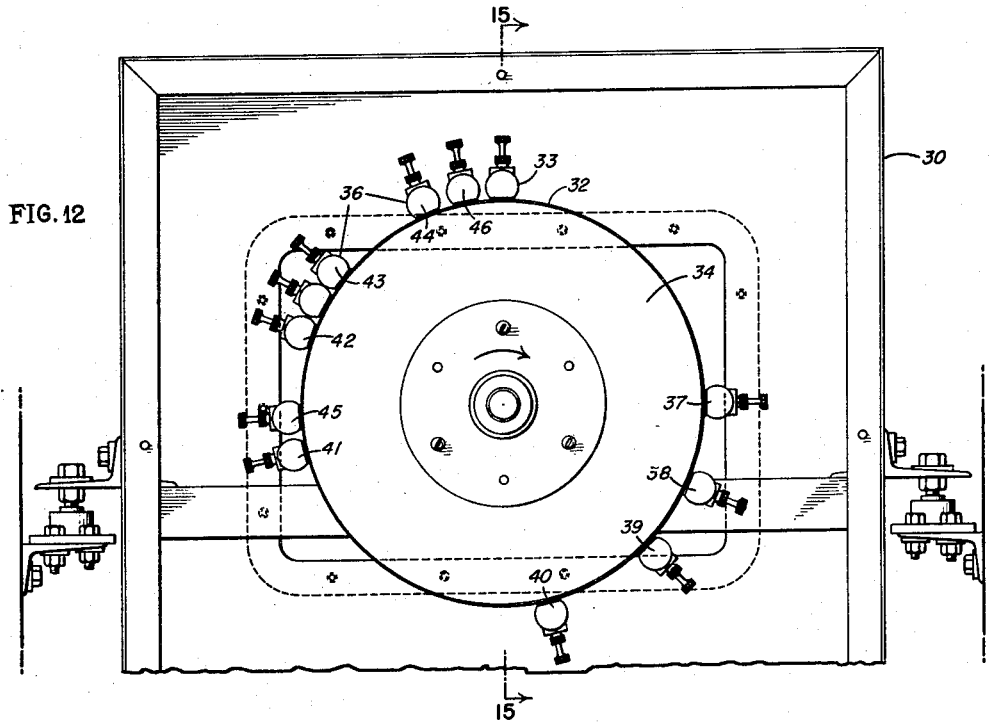
Figure 12 is a fragmentary front elevational view on an enlarged scale of the upper portion of the control box of the apparatus with the cover removed to show the details of construction of the magnetizable recorder disk and related mechanism.
Figure 14:
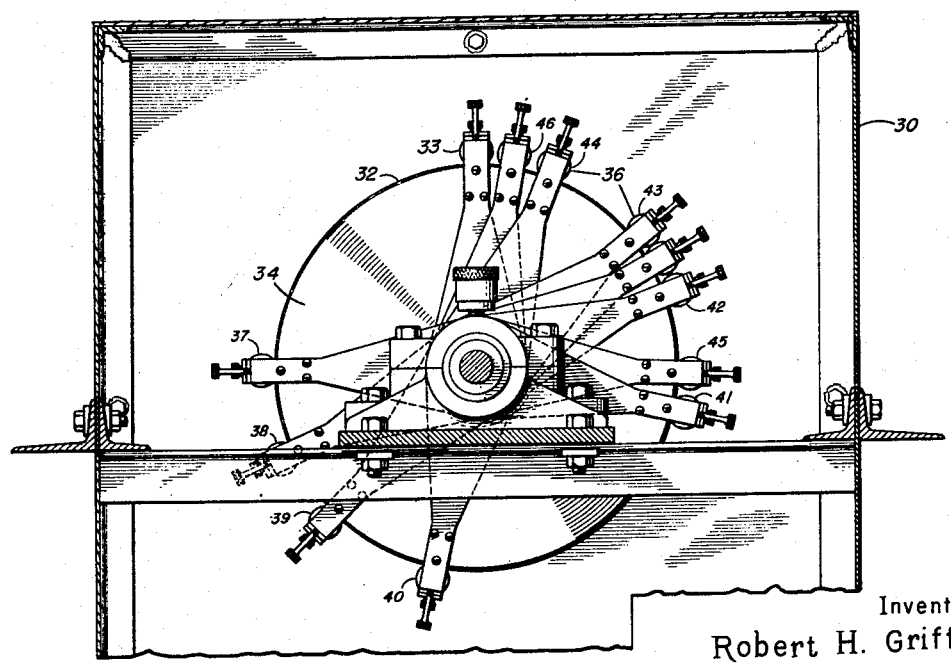
Figure 14 is a vertical sectional view on the scale of Figure 12, taken along the lines 14—14 of Figure 13.
Figure 13:
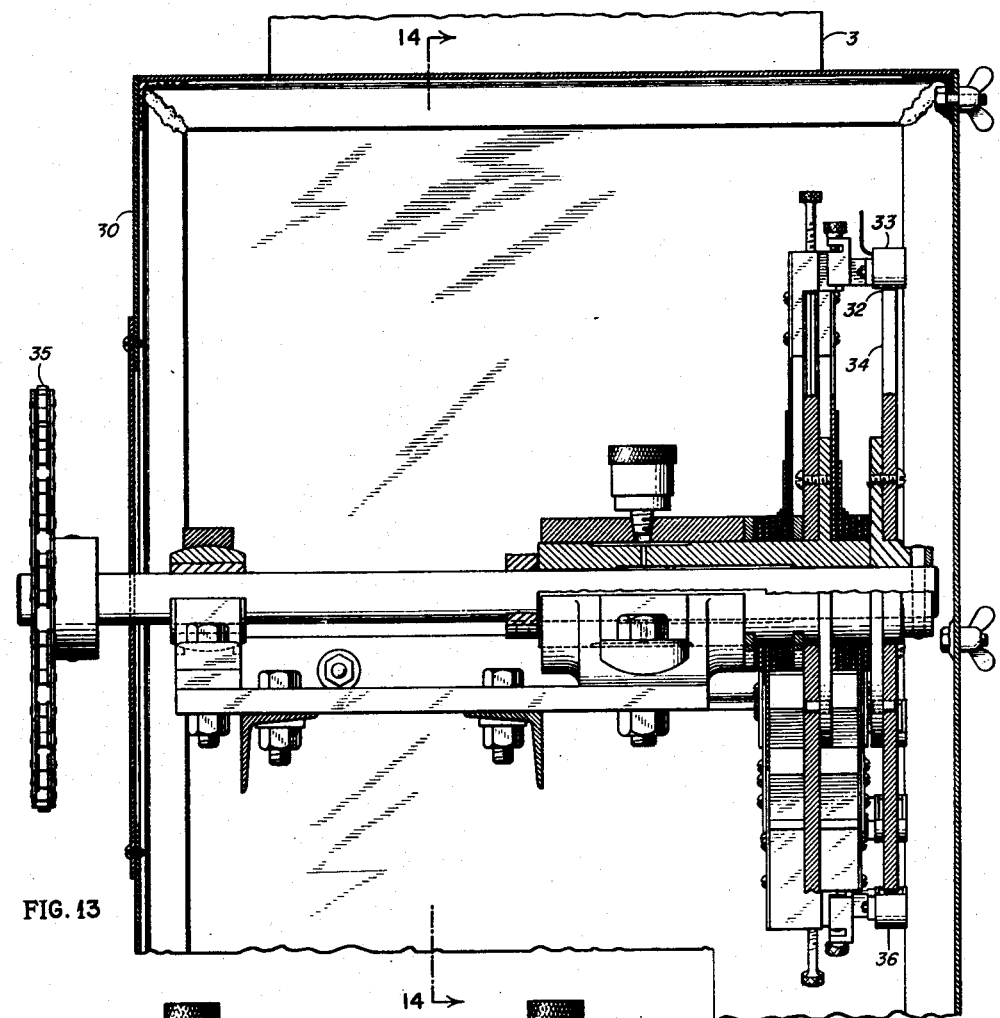
Figure 13 is a side elevational view on an enlarged scale of the control unit of Figure 12 with portions removed and shown in section to more clearly illustrate certain of the details of construction.
Figures 15, 16, 17:
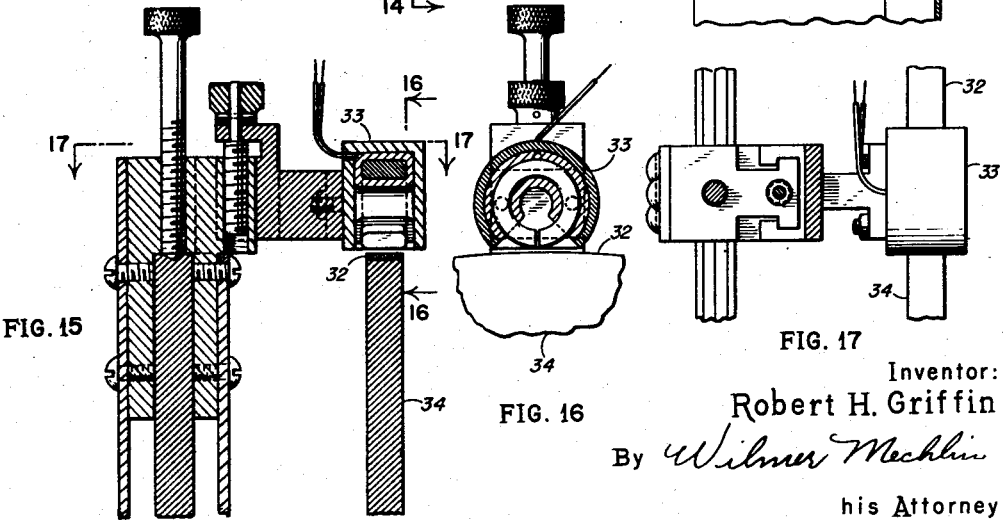
Figure 15 is a fragmentary vertical sectional view on an enlarged scale, taken along the lines 15—15 of Figure 12, showing in cross-section a typical magnetic head and the disposition of its components relative to the recorder disk.
Figure 16 is a fragmentary vertical sectional view, taken along the lines 16—16 of Figure 15.
Figure 17 is a fragmentary horizontal sectional view, taken along the lines 17—17 of Figure 15.

For the solenoid actuated valve of each bank of nozzles, there are provided a pair of pick-up heads 36, adjustably disposed about the disk along the path of the magnetic tape 32, in positions related to the distance of the bank, along the path of travel of a skin, from the photoelectric cell. Of each pair, one head serves as an on head, for cutting on or starting the flow of fluid to the associated bank and the other head as an off head by which the flow to the bank is cut or shut off. The several heads are arranged about the disk 34 in the manner shown in Figure 12, the off and on heads, 37 and 38, of the first bank 15 following the inducing head 33 and the off and on heads, 39 and 40, of the second bank 16, the off and on heads, 41 and 42, of the third bank 17, and the on and off heads, 43 and 44, of the fourth bank 18, respectively, being disposed in that order about the disk therebeyond. Also, there are interposed, intermediate the off and on heads, 41 and 42, of the third bank, an on head 45 for the water spray 23 and between the last of the pick-up heads and the inducing head, an erasing head 46 for erasing or wiping out a signal by a high frequency alternating current or other suitable means. On passing the erasing head, the tape is thus presented in clear or non-magnetized condition for the induction of a new signal by the inducing head on breaking of the light beam of the photoelectric cell 31 by a succeeding skin.

Figure 18:
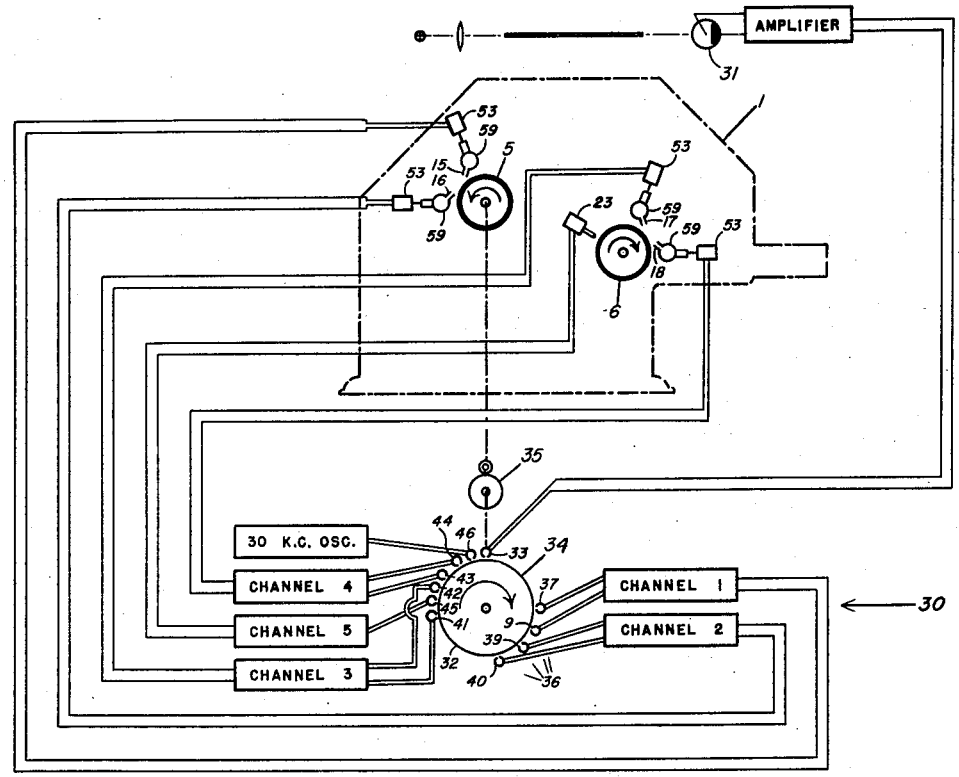
Figure 18 is a schematic view showing the relation between the electronic control mechanism and the cyclically operating elements of the apparatus.
Figure 19:
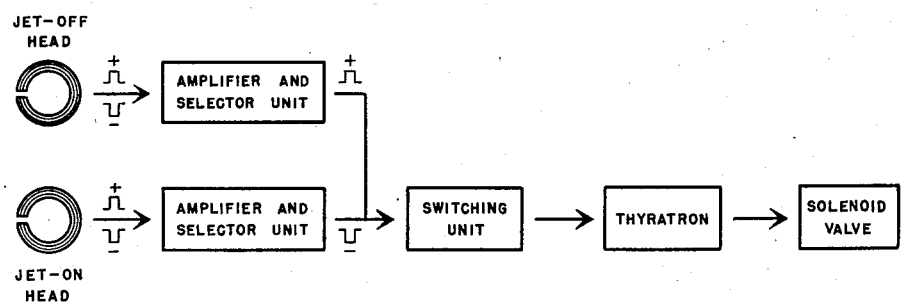
Figure 19 is a block diagram of the control circuit of a typical bank of jets.
Figure 20:
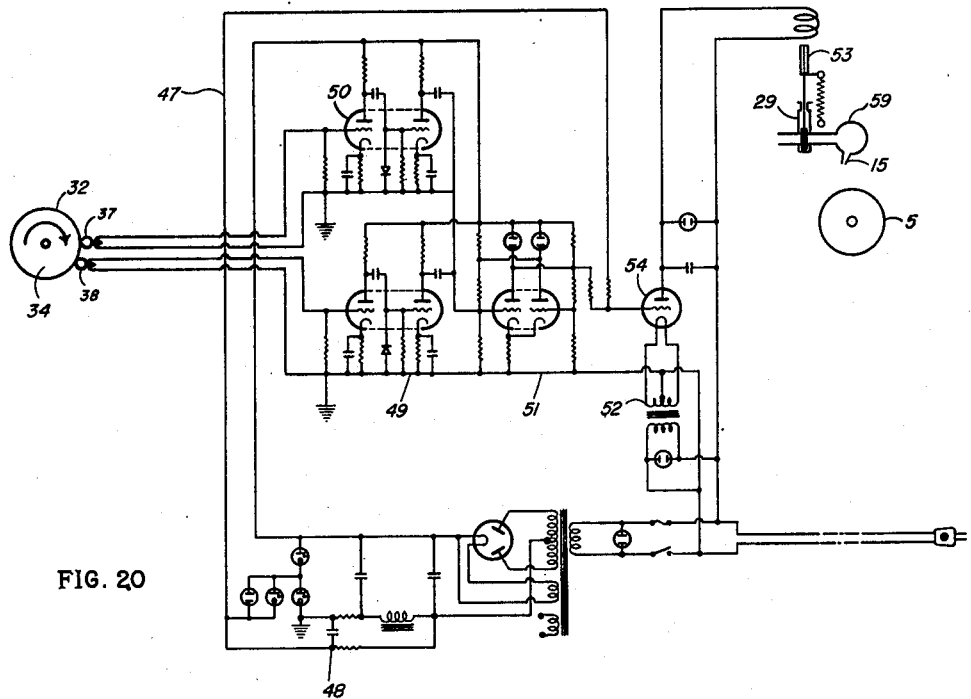
Figure 20 is a wiring diagram typical of the power supply and control circuits by which each of the several jets is actuated.
Figure 21:
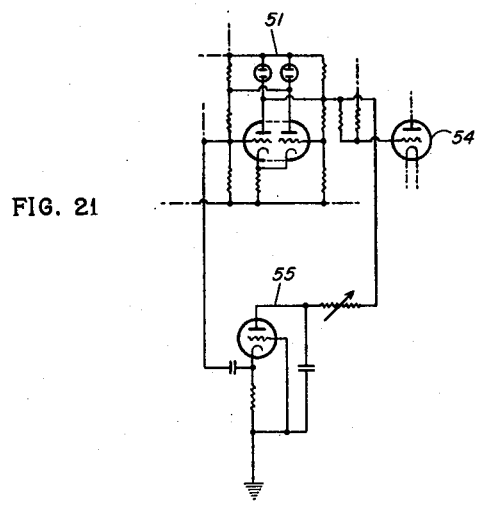
Figure 21 is a wiring diagram of an alternative circuit for actuating the fluid pressure device by which a skin may be detached from the feed conveyor.

A wiring diagram of an electronic circuit 47 for actuating the solenoid valve 29 of the first bank 15, which is designed generally, in Figure 18, as channel 1 and is typical of the correspondingly numbered channels 2, 3 and 4 of the second, third and fourth banks, 16, 17 and 18, respectively, is shown in detail in Figure 20, together with that of a power supply circuit 48 for supplying special plate, grid and heater voltages to all of the control circuits. This typical circuit 47 is comprised of individual amplifying and selecting units 49 and 50 for the on and off heads, 38 and 37, respectively, which are connected to a common switching unit 51 controlling operation of a power unit 52 by which the solenoid 53 of the solenoid actuated valve 29 is energized and deenergized. As explained in detail in my application Serial No. 159,436, pulses are induced in both the on and off heads as the leading and trailing ends of the magnetic signal on the tape 32 pass thereunder. However, the selecting units, 49 and 50, screen or shunt out one of these pulses, permitting transmission to the switching unit 51 by the on head 38 only of a pulse induced by the leading edge of the signal and by the off head 37 only the pulse of opposite polarity induced by the trailing edge. Considering the pulse induced by the leading edge of the signal a positive pulse and that by the trailing edge a negative pulse, the switching unit 51 enables the initially positive pulse from the on head to start the thyratron 54 of the power unit 52 and to maintain it in operation until a pulse from the off head is received. The thyratron, in turn, actuates the solenoid 53 of the valve 29, opening the valve and causing the jets of the first bank to operate or act on a skin during the same interval. Since the water spray 23 need act only on the leading portion of a skin, its control circuit does not require an off head and its attendant amplifying and selecting unit and can substitute therefor a variable resistor circuit 55 by which the duration of the spray can be preset to limit its action to the time required for the leading edge of the skin to reach the succeeding or fourth grip roll 22.

With a control circuit such as above described for each of the banks of nozzles and the signal on the tape 32 an image in length and position of the skin undergoing treatment, each of the several banks of nozzles is enabled automatically to be cut on and off in timed relation to the travel of the skin past its treating station. The start of action of the resultant jets is predetermined by adjusting the positions of the pick-up heads 36, such that each bank will act on or treat at least the leading or trailing half of the minimum length skin in the batch being treated. However, once set, the duration of treatment will automatically be adjusted to conform to the length of each individual skin, enabling the apparatus to treat effectively successive skins in exact correspondence with their lengths and, by always presenting a non-magnetized portion of the tape 32 to the inducing head 33, set up a new cycle for and cyclically treat a succeeding skin immediately following its predecessor.

With the foregoing part of the specification devoted primarily to those portions of the apparatus of the present invention by which a skin is presented for treatment and by which the treatment is cyclically controlled, the hydraulic or other fluid pressure portions of the apparatus by which treatment is obtained will now be described in detail. The wide variety of skins used in the manufacture of leather presents several variables for which allowance must be made in apparatus for automatically unhairing and fleshing a succession of skins. In addition to variations in length, for which the described cyclic control provides, these variables are the type and kind of skins in the batch to be treated and their condition as introduced into the apparatus. As to type and kind, it will generally be necessary to apply fluid under somewhat greater pressure if the skins are either soft or light than if they are tough or heavy. While in fleshing the texture of the flesh will differ somewhat with different types of skins, the effect of the several possible variables is reduced by the thin or fine membrane of tough tissue found in all skins between the flesh or fatty tissues and the corium or skin proper. In tests, this membrane has proved sufficiently strong to withstand penetration by fluid forces which are adequate to remove all the flesh, thereby preventing damage to the skin and, by providing a smooth limiting surface, serving as a sharp line of demarkation which permits considerable latitude in fleshing different types of skins for any given setting of the apparatus. In unhairing, the effect of the several variables may also be reduced by liming or otherwise chemically treating the skins beforehand so as to loosen both the epidermis and the hair at its roots. Such prior chemical treatment not only facilitates the subsequent removal of these tissues, but can be adjusted to the type of skins so that they reach the apparatus with their hair sides in substantially uniform condition, enabling extended runs to be made with a given fluid pressure setting of the apparatus.

Due to the nature of the treating medium and the numerous variable factors upon which the applied force is dependent, with consequent almost unlimited adjustability, fluid pressure particularly lends itself to unhairing and fleshing. Since water is not only an inexpensive and effective medium, but must be available in a tannery for many other purposes, these factors, while also governing the use of other fluids, hereafter will be described specifically with reference to hydraulics. So considered, the hydraulic factors, all of which affect the effective force or impact on a skin, are the pressure and volume of flow at the nozzle, the distance of the nozzle from the point of impact, and the area and angle of the jet at impact. Another factor which must be considered, apart from the hydraulic factors, is the speed of travel of a skin past the point of impact.

As the force or impact upon a skin varies directly with the pressure and volume of the fluid, it is possible, within limits, to obtain the required action at the expense of one or the other of these factors. Thus, where power is cheap and water expensive, it would be more economical to reduce the volume of flow toward its lower limit and correspondingly increase the pressure. Conversely, if pressure is the more expensive, it can be reduced within limits and the volume correspondingly increased. Expressed in terms of pressure and orifice diameter, effective results have been obtained in both unhairing and fleshing with orifices ranging in diameter from $\frac{1}{16}$ to $\frac{1}{2}$ inch and pressures from 150 to 1200 p. s. i. However, in general, better results have been obtained with orifices of from $\frac{1}{8}$ to $\frac{1}{4}$ inch in diameter and pressures of from 300 to 700 p. s. i.

In using high pressure jets, the pressure drop is negligible from the nozzle for a distance of about 12 inches. Therefore, for a given pressure and volume of flow, the impact is substantially the same throughout this distance. However, the critical factor is, of course, not the impact, but the area over which it is applied. Consequently, since considerable spreading or fanning out of the jet is unavoidable, the impact will be more effective the less its distance from the nozzle. In practice, with other variables adjusted accordingly, spacing of the nozzle within 2 inches of the skin has produced the best results.

Of the other hydraulic factors, the area of impact is determined by the type of nozzle employed. Due to its concentration of force, a nozzle producing a thin or flat spray at the point of impact and forming a thin sharp cutting edge across the skin has proved most effective. The difficulty with such a jet is that few nozzles are capable of holding a pressure more or less constant along the line of contact at pressures above 300 p. s. i. Also, flat sprays produced by interference streams at the nozzle are usually less efficient than those obtained by a baffle-type nozzle having a circular opening. The baffle-type nozzle 13, illustrated, has been found to possess the requisite properties. As shown, this nozzle has an integral flaring baffle 56 which curves upwardly across the axis of the orifice 57 and contains the fluid between side walls 58 which, for minimum turbulence, continue the Venturi shape of the orifice. Depending upon the applied pressure, such nozzles have proved effective with orifices of the aforementioned $\frac{1}{8}$ to $\frac{1}{4}$ inch range of diameters and baffles having a deflection angle relative to the axis of the orifice of 8° to 25° and a spray angle, as determined by the flaring of the side walls 58 relative to that axis of from 15° to 40°. Having a nozzle capable of delivering constant pressure throughout the width of the jet, such uniformity must not be impaired or upset by interference with the jets of adjacent nozzles, if a constant effective force or pressure is to be maintained over the area of impact. Such interference may be avoided by mounting the plurality of nozzles comprising each of the banks, 15, 16, 17 and 18, in oblique or echelon formation in which the baffles 56 of the nozzles are turned slightly out of the common plane of their axes so that the ends of the jets overlap and completely cover the width of a skin without interference. Alternatively, the baffles may be mounted in a common plane with the ends of the jets abutting, without adversely affecting the resulting pressure, by adding a small amount of detergent to the fluid. Also, it is possible to achieve the same result with nozzles incapable of delivering uniform pressure across their impact lines by mounting the nozzles in line and so adjusting their overlaps as to compensate for any variations.

The last of the hydraulic factors is the angle which the jets make with a skin at the point of contact. This angle, measured in terms of a tangent to that point, is determinative of the tangential and normal components of the applied force and, thereby, both the extent of penetration and the severing action of the jets on the skin. With the jets of the banks of each pair converging or inwardly directed, as in the illustrated embodiment, this angle is also affected by the direction of the particular jet relative to the travel of the skin. Thus, the force of the jets of the second and fourth banks, 16 and 18, which oppose the direction of travel, is augmented by that travel while that of the jets of the first and third banks, 15 and 17, which conform to the direction of travel, is correspondingly decreased. Consequently, with the other hydraulic factors fixed, the angle of impact of the jets of the opposing banks will be less than those of the banks which act in the direction of travel. The critical limits of these angles have been determined to be from 25° to 60° for the opposing banks and from 45° to 75° for the conforming banks.

The remaining of the factors controlling in the apparatus, the speed of travel or traverse of a skin past the jets, is not only responsible for the difference in the impact angles of the opposing and conforming jets, but also determines the time interval during which the force of the jet is applied and thus the work done on a particular skin. At the same time, the speed of travel directly affects the output of the apparatus. Consequently, while it is possible effectively to treat skins travelling as slowly as ¼ foot per second, it is preferred that the skins travel at the optimum rate at which they can be fed into the apparatus, or in excess of 2 feet per second.

In the illustrated apparatus, provision is made for adjusting the hydraulic components to obtain the aforementioned desired variations in the several hydraulic factors within the prescribed limits. To this end, the nozzles 13 of each bank are mounted on a header 59 extending transversely across and axially parallel to the associated drum. The opposite ends of each of these headers are swivelly or rotatably mounted in or connected to a pair of elbows or joints 60, which with the headers and remaining piping are of sufficient strength to withstand the high pressure to which they are subjected. These elbows are adjustably carried or supported on the inner walls of the adjacent of the sides 3 of the frame 1 by adjustable anchors 61, designed to permit the elbows and therethrough the headers to be shifted in any direction parallel to the sides, thus to vary the spacing between the nozzles and the associated drums. In the form illustrated, each elbow is connected to its anchor through a stem or trunnion 62 integral with the elbow and coaxial with the header. For supporting the elbow through the stem, the anchor, which may conveniently be mounted on a bracket 63 welded to the frame, has a horizontally slidable or reciprocable block 64 having an upwardly opening slot or aperture 65, in which the stem is slidably seated or received. For moving the block horizontally, there is provided an adjusting screw 66 carried by a lug 67 welded to and upstanding from the bracket 63 and spaced sufficiently from a track member 68, carrying the block, to permit horizontal movement of the associated header to the extent desired. Within the slot 65, the stem 62 rides or is supported on a pillow block or saddle 69, also slidable vertically of the slot and adjustable in vertical position relative to the anchor by shims or like means 70. For rotating the header, to vary the impact angle of the jets emitted by the nozzles 13 for any given setting of the elbows 60, each of the headers may be provided intermediate the elbows with a lever arm 71 swivelly connected to an adjusting link or rod 72, the latter, in turn, being carried on and acting against an angle iron or other cross-member 73 of the frame. With this construction the nozzles are enabled to be swung and shifted substantially parallel to a plane aligned with the direction of movement of the work supports, thus ensuring uniformity of impact transversely of the work.

To ensure uniform pressure across each header 59, fluid is supplied to each of its elbows 60 from a distributing pipe 74, spaced from and extending parallel to the header across the frame, by a connecting pipe 75. As shown, the ends of the distributing pipe are carried by collars or like fittings 76 which may be welded or otherwise fixed to the adjacent sides of the frame. To compensate for shifting of each header radially of its distributing pipe 74, as the header is adjusted in position by its adjustable anchors 61, the connecting pipes 75 are connected to the distributing pipe through T's 77 which are swivelly connected to the outer portions 78 of the distributing pipe. The corresponding variation in the length of the connecting pipes 75 may be obtained by providing in each an expansion joint or coupling 79. It is contemplated that fluid be supplied to all of the headers from a common supply pipe 80, which may be suspended or hung from the transverse of the I-beams 4, the desired fluid connection being obtained by feeding the fluid to each of the distributing pipes, intermediate one of the swivel T's 77 and the adjacent collar 76, by conduits 81. Fluid is, in turn, supplied to the supply pipe 80 through a pump (not shown), capable of delivering fluid over the desired range of pressure and fluid flow, one having a maximum capacity of at least 1,000 gallons per minute at a pressure of 750 p. s. i. being especially suited for this purpose. Any possible pulsations in the flow through the supply pipe are preferably eliminated by a surge tank 82, which may be mounted on the supply pipe 80.

For restricting the fluid from the jets 14 after the latter have acted on a skin, as well as for containing the valuable by-product waste removed by the jets, there are provided for the unhairing drum an unhairing hopper 83 and for the fleshing drum a fleshing hopper 84. These hoppers are supported on the frame through suitable cross-braces and each has an upper end portion 85 which projects over and partly encloses the associated of the drums, 5 and 6, and the headers 59, the portion 85 being closed except for waste-receiving openings 86 confronting and overlapping the drums. To minimize splash-back, the hoppers above and below the openings 86 are preferably provided with curved deflector plates 87. By virtue of the convergence of the jets of each pair of banks, in the disclosed embodiment, the waste-receiving openings in the hoppers may be relatively narrow circumferentially of their associated drums and still effectively contain the expended fluid and waste matter. The fluid and waste, on entering the openings in the hoppers, are directed downwardly therein through funnel sections 88 to a collecting bin 89 of the unhairing hopper and to a spout 90 of the fleshing hopper by which the waste flesh is led to a bin or other suitable receptacle (not shown). After reaching the bins, the excess fluid may be removed by suitable means and the waste matter collected for further processing.

From the above detailed description it will be apparent that there has been provided an improved fluid pressure treatment for skins, the disclosed apparatus for which is not only adapted automatically to treat a succession of skins and to remove all natural and foreign matter from the opposite sides thereof, but is capable of adjustment to meet practically all variations in skin conditions and, once adjusted, will treat uniformly skins of a given type with considerable latitude in their condition. It should be understood that the described and disclosed embodiment is merely exemplary of the invention and that all modifications are intended to be included which do not depart either from the spirit of the invention or the scope of the appended claims.

Having described my invention, I claim:

1. Apparatus for treating skins comprising a movable work support, nozzle means associated with said support, means for varying the spacing and angular disposition of said nozzle means substantially parallel to a plane normal to and extending in the direction of surface movement of said support, and fluid jet means directable against said support by said nozzle means at variable pressure.

2. Apparatus for treating skins comprising a work support, jet means directable against said support at an impact substantially uniform transversely thereof for severing and removing natural matter from a skin supported thereon, and means for varying the angular disposition of said jet means relative to said support while maintaining said transverse uniformity of impact.

3. Apparatus for treating skins comprising a work support, nozzle means associated with said support, means for causing relative travel between said support and nozzle means, fluid jet means directable by said nozzle means against a skin carried by said support under sufficient pressure to sever and remove natural matter therefrom, and cyclic control means synchronized in movement with said relative travel for actuating said jet means in timed relation to said relative travel past a reference point.

4. Apparatus for treating skins comprising a movable work support for supporting a skin, a pair of spaced banks of nozzles associated with said support and directed convergently thereto-wards, fluid jet means directable against said skin by said nozzles at a pressure of from 300 to 700 p. s. i., and means for varying the spacing and angular disposition of said nozzles relative to said skin.

5. Apparatus for treating skins comprising a movable work support for supporting a skin, means for gripping a skin to said support and presenting an entire side thereof for treatment, a pair of spaced convergently directed banks of nozzles associated with said support, one opposing and the other conforming to the direction of travel of said skin on said support, fluid jets directable by each of said banks at said presented side of said skin at a pressure of from 300 to 700 p. s. i., and means for varying the impact angle with said side of said jets of said opposing bank from 25° to 60° and of said jets of said conforming bank from 45° to 75°.

6. Apparatus for treating skins comprising a movable work support for supporting a skin, means for gripping a skin to said support and presenting an entire side thereof for treatment, a pair of spaced convergently directed banks of nozzles associated with said support, one opposing and the other conforming to the direction of travel of said skin on said support, fluid jets directable by each of said banks at said presented side of said skin at a pressure of from 300 to 700 p. s. i., means for varying the impact angle with said side of said jets of said opposing bank from 25° to 60° and of said jets of said conforming bank from 45° to 75°, and means for cyclically controlling treatment by said jets of each of said banks in timed relation to travel of said skin past a reference point.

7. Apparatus for treating skins comprising a support, means for moving said support at a linear speed of at least ¼ foot per second, means for gripping a skin to said support and presenting an entire side thereof for treatment, a pair of spaced convergently directed banks of nozzles associated with said support, one opposing and the other conforming to the direction of said travel of said support, fluid jets directable by each of said banks at said presented side of said skin at a pressure of from 300 to 700 p. s. i., means for varying the impact angle with said side of said jets in said opposing bank from 25° to 60° and of said jets of said conforming bank from 45° to 75°, and means for cyclically controlling treatment by said jets of each of said banks in timed relation to travel of said skin past a reference point.

8. Apparatus for treating skins comprising a rotary drum, a conveyor encircling said drum for conveying a skin thereto and presenting a face of said skin for treatment thereon, a plurality of fluid pressure treating devices positioned in spaced stations about said drum and acting on said skin in convergent directions, and a plurality of gripping devices positioned about said drum in spaced stations including therebetween said stations of said treating devices, said gripping devices each pressing said conveyor against said drum and changing the direction of travel thereof outwardly of said drum, and said devices coacting to grip said skin to said drum and spread said skin for treatment by said treating devices.

9. Apparatus for treating skins comprising a rotary drum, a conveyor encircling said drum for conveying a skin thereto and presenting a side of said skin for treatment thereon, a pair of treating devices positioned in spaced stations about said drum and acting on said skin in convergent directions, and a pair of gripping devices each yieldably urging said conveyor against said drum and changing the direction of travel thereof outwardly of said drum, and each of said gripping devices coacting with the adjacent of said treating devices for gripping said skin to said drum and spreading said skin for treatment by said treating devices.

10. Apparatus for treating skins comprising a movable work support, a pair of convergent high pressure fluid jets directable against said support for treating a side of a skin supported thereon, and control means for cyclically limiting the action of each of said jets to a portion of said side in predetermined relation to travel of said skin past a reference point in advance of said jets.

11. Apparatus for treating skins comprising a movable work support, nozzle means associated with said support and shiftable in height substantially parallel to a plane extending in the direction of surface movement of said support and fluid jet means directable against said support by said nozzle means.

12. Apparatus for treating skins comprising a work support, a header disposed transversely of said support, a plurality of nozzles carried by said header and spaced substantially equally from said support for directing fluid jets there against, and means for shifting the height of said nozzles relative to said support while maintaining said equality of spacing.

13. Apparatus for treating skins comprising a work support, a nozzle support disposed substantially parallel to said work support, means for shifting said nozzle support in any direction substantially parallel to a plane normal to and extending in the direction of surface movement of said work support, and a plurality of nozzles carried by said nozzle support and spaced therealong for directing fluid jets at a skin on said work support.

14. Apparatus for treating skins comprising a work support for presenting opposite sides of a skin for treatment, jet means associated with said support for treating said presented sides of said skins, means for causing relative movement between said support and jet means, and control means synchronized with said relative movement and actuated by a skin in advance of said jet means for cyclically controlling operation of said jet means in timed relation to said relative movement.

15. Apparatus for treating skins comprising a movable work support for presenting both sides of a skin for treatment, jet means associated with said support and directable at said sides of said skin for detaching hair and flesh therefrom, and control means synchronized in movement with said support and actuated by travel of a skin past a reference point for causing said jet means to treat said skin in timed relation to travel thereof.

16. Apparatus for treating skins comprising a movable work support for presenting both sides of a skin for treatment, jet means associated with said support and directable at said sides of said skin at pressures of 150 p. s. i.–1200 p. s. i., for detaching hair and flesh therefrom, and control means having means synchronized in movement with said support and actuated by travel of a skin past a reference point for causing said jet means to treat said skin in timed relation to travel thereof.

ROBERT HAMILTON GRIFFIN.

References Cited in the file of this patent

UNITED STATES PATENTS

| Number | Name | Date |
|---|---|---|
| 519,345 | Puech | May 8, 1894 |
| 742,115 | Forbes | Oct. 20, 1903 |
| 1,456,783 | Chapman | May 29, 1923 |
| 1,731,564 | De Graff | Oct. 15, 1929 |
| 1,969,914 | Swigert | Aug. 14, 1934 |
| 2,169,754 | Beyster | Aug. 15, 1939 |
| 2,203,606 | Whitfield | June 4, 1940 |
| 2,289,967 | Johnson et al. | July 14, 1942 |
| 2,342,533 | Edwards | Feb. 22, 1944 |
| 2,374,846 | Thresh | May 1, 1945 |

FOREIGN PATENTS

| Number | Country | Date |
|---|---|---|
| 1,371 | Great Britain | of 1869 |